Aug. 11, 1925.  
E. F. JOHNSTON  
AUTOMOBILE WINDSHIELD  
Filed June 30, 1922  
1,549,134  
2 Sheets-Sheet 1

Inventor  
Edgar F. Johnston  
By George J. Oltsch  
Attorney

Aug. 11, 1925.

E. F. JOHNSTON

AUTOMOBILE WINDSHIELD

Filed June 30, 1922

Inventor

Edgar F. Johnston

By George J. Ottoch

Attorney

Patented Aug. 11, 1925.

1,549,134

UNITED STATES PATENT OFFICE.

EDGAR F. JOHNSTON, OF SOUTH BEND, INDIANA.

AUTOMOBILE WINDSHIELD.

Application filed June 30, 1922. Serial No. 572,013.

*To all whom it may concern.*

Be it known that I, EDGAR F. JOHNSTON, a citizen of the United States, residing at South Bend, in the county of St. Joseph and State of Indiana, have invented certain new and useful Improvements in Automobile Windshields, of which the following is a specification.

The invention relates to automobile windshields and has for its object to provide a device of this character particularly adapted for use for shielding occupants of the rear seat of an automobile from the wind, the windshield being pivotally connected to a bracket at each side of the automobile top above the rear seat and formed from hingedly connected sections adapted to be folded onto each other and folded upwardly into the top of the automobile provided with means whereby it may be held in raised position.

A further object is to provide the sides of the windshield with curtains, which curtains when the windshield is in operative position may be secured in such a manner as to protect the occupants of the rear seat from wind. The curtains, when the windshield is in raised inoperative position, are foldable onto the upper side of the windshield.

A further object is to provide means comprising springs cooperative with the windshield, said springs being provided with sufficiently tension whereby when the vehicle is at a standstill, the windshield will be held at various positions to which it may be moved, thereby allowing easy egress or ingress from the machine without interference from the windshield.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1:
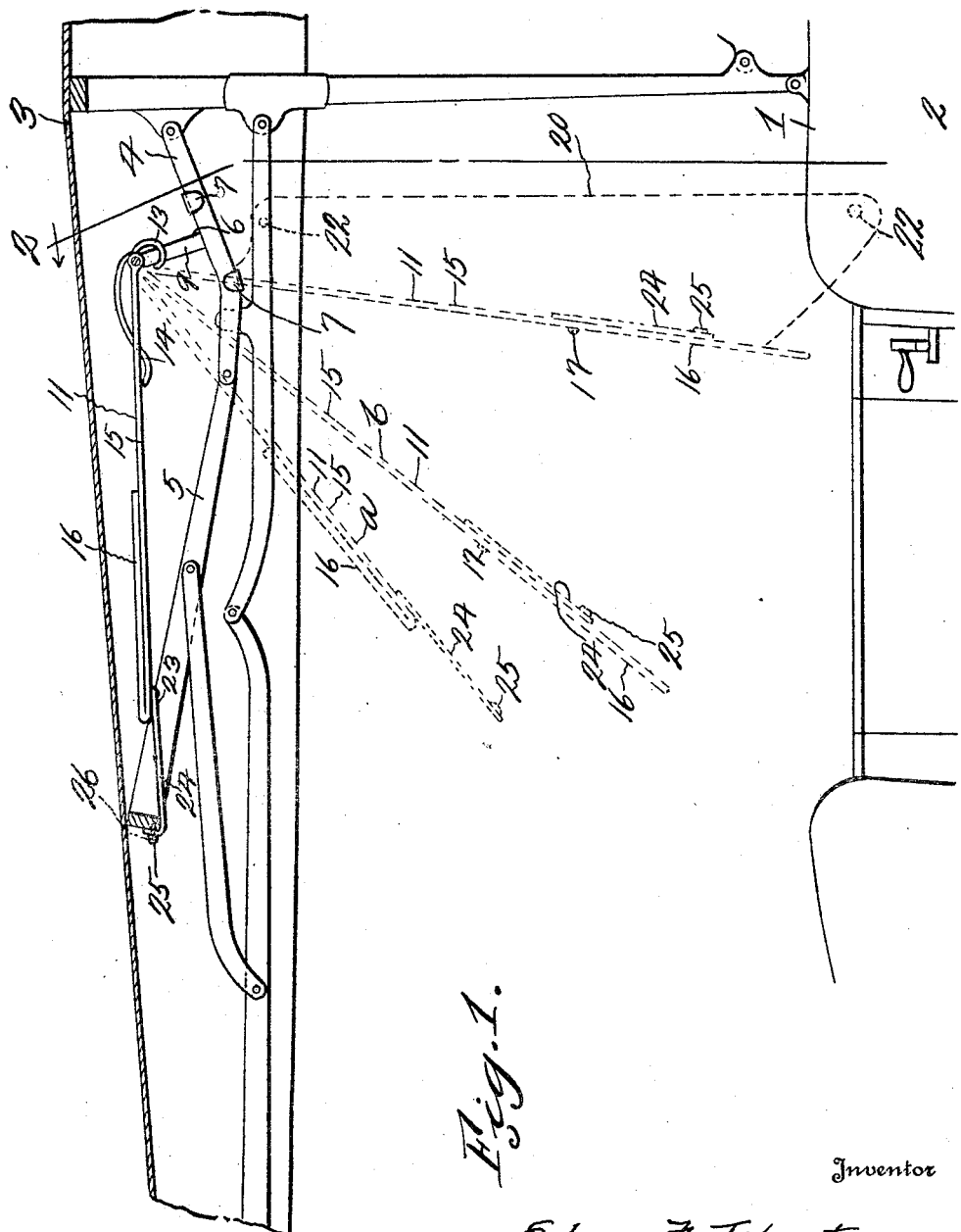
Figure 1 is a vertical longitudinal sectional view through the top of an automobile, a portion of the framing of the top, showing the windshield applied thereto, the side curtains being eliminated for clearness.
Figure 2:
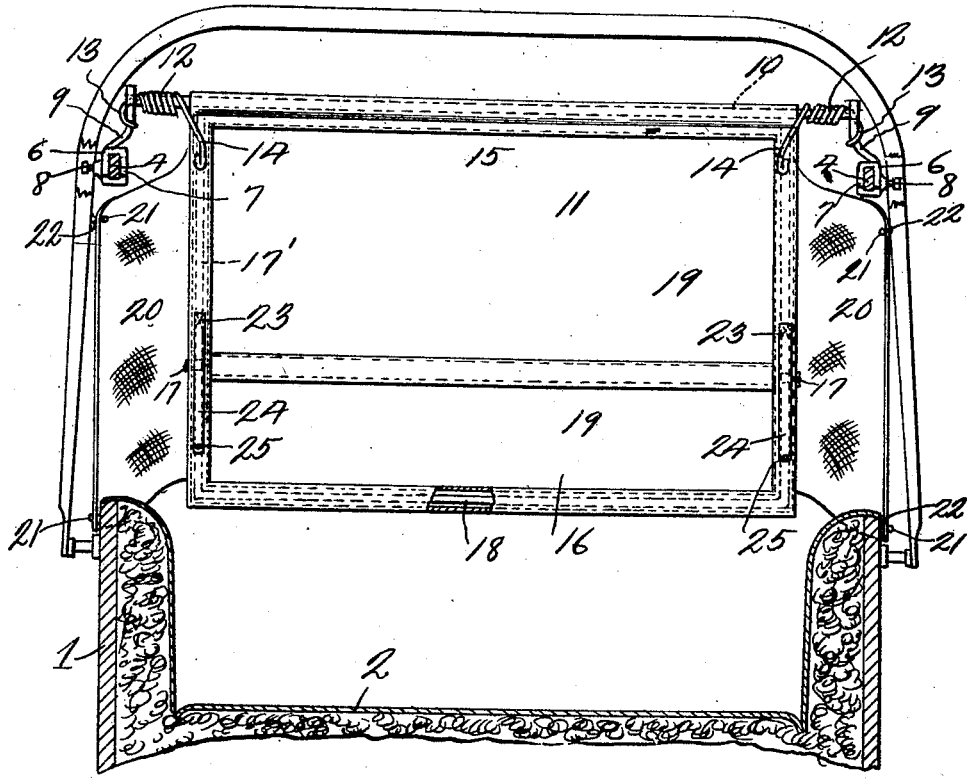
Figure 2 is a vertical transverse sectional view through the automobile top and rear seat of the automobile taken on line 2—2 of Figure 1, and showing the windshield in operative position.
Figure 3:
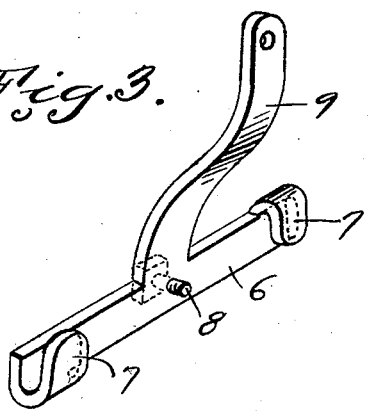
Figure 3 is a perspective view of one of the windshield supporting brackets.

Referring to the drawings, the numeral 1 designates the body of a conventional form of automobile and 2 the rear seat thereof. The top 3 of the automobile is of conventional form and comprises the break joint arms 4 and the bow 5. Disposed on the break-joint arms 4 are removable brackets 6. The brackets 6 are provided with lugs 7 which overlie the break joint arms 4 and set screws 8 whereby the brackets may be securely clamped on the break joint arms 4. Extending upwardly and curving inwardly and upwardly from the brackets 6 are arms 9. which arms support a transversely disposed shaft 10 of the windshield 11, and on which shaft the windshield rotates, in such a manner that the windshield may be moved to any of the full or dotted line positions shown in Figure 1. Disposed on the ends of the shaft 10 between the arms 9 and the ends of the windshield 11 are coiled springs 12, which coiled springs have one of their ends 13 anchored to the arms 9 and their other ends terminating in downwardly extending spring arms 14 which engage the rear side of the windshield 11, said arms 14 and coiled springs 12 having sufficient tension to hold the windshield in any position to which it may be moved, particularly dotted line positions *a* and *b* in Figure 1, which positions are the positions the windshield assumes when a person is entering or leaving the automobile, at which time it will not be necessary for the person to hold the windshield during ingress or egress.

The windshield 11 comprises sections 15 and 16, which sections are preferably hingedly connected together at 17 in such a manner that the section 16 may be folded onto the section 15 as shown in full lines in Figure 1 when it is desired to move the shield to inoperative position adjacent the underside of the top 3 of the automobile. Sections 15 and 16 are preferably formed from canvas or leather, and are provided with frames 17' and 18, and also with transparent material 19 through which the occupant of the rear seat of the automobile may look. The ends of the sections 15 and 16 are provided with side curtains 20, which are preferably formed from canvas, and are provided with snaps 21 whereby they may be easily and quickly attached to snap male members 22 carried by the top and by the sides of the body 1. When the windshield is in inoperative position as shown in Figure 1, the side curtains 20 are folded onto the upper side of the folded windshield, said curtains not being shown in Figure 1 for purposes of clearness.

Secured at 23 to the rear side of the windshield section 15 adjacent its lower end are straps 24, the free ends of which straps are provided with snap members 25 adapted to be received by the snap members 26 carried by the bow 5, thereby holding the windshield when in folded position adjacent the top 3 of the automobile.

From the above it will be seen that a rear seat windshield is provided for automobiles, which is simple in construction, may be applied to conventional forms of automobile tops without modifying the structure of the top, and one wherein means is provided for holding the windshield in a position where it will not interfere with a person entering or leaving the rear seat of the automobile.

The invention having been set forth what is claimed as new and useful is:—

1. The combination with an automobile top, a U-shaped bow carried thereby and having its arms substantially horizontally disposed, break joint arms carried by the bow arms, of a windshield entirely supported by said break joint arms and movable to a substantially horizontal position adjacent the top and downwardly, T-shaped brackets detachably secured to the break joint arms, one of the arms of said T-shaped brackets extending upwardly towards the top, a rod connecting said upwardly extending arm, said windshield being mounted on said rod and spring means carried by the rod adjacent its ends and cooperating with the upwardly extending bracket arms and the windshield for counterbalancing said windshield in various positions.

2. The combination with an automobile top, a U-shaped bow carried thereby and having its arms substantially horizontally disposed, break joint arms carried by said bow arms, of means for supporting a windshield entirely on said break joint arms, said means comprising T-shaped brackets having their alined arms engaging the sides of the break joint arms and registering therewith, the ends of said alined arms being provided with hooked members engaging opposite upper and lower sides of the break joint arms, set screws carried by the brackets and engaging the sides of the break joint arms and in combination with the hooked members securely holding the T-shaped brackets on the brake joint arms, the other arms of the T-shaped brackets extending upwardly, and a windshield pivotally mounted and supported on said upwardly extending arms of the brackets.

In testimony whereof I affix my signature.

EDGAR F. JOHNSTON.